(12) United States Patent
Aitken et al.

(10) Patent No.: US 6,405,565 B1
(45) Date of Patent: Jun. 18, 2002

(54) CHALCOGENIDE GLASS TUBING FABRICATION

(75) Inventors: Bruce G. Aitken; David H. Crooker, both of Corning; Mark L. Powley, Campbell, all of NY (US)

(73) Assignee: Corning Incorporated, Corning, NY (US)

( * ) Notice: Subject to any disclaimer, the term of this patent is extended or adjusted under 35 U.S.C. 154(b) by 8 days.

(21) Appl. No.: 09/704,118

(22) Filed: Nov. 1, 2000

(51) Int. Cl.$^7$ ................................................ C03B 19/04
(52) U.S. Cl. ............................. 65/302; 65/109; 65/335; 65/389; 65/DIG. 15; 264/311; 425/435; 249/137; 432/103; 432/106; 432/107
(58) Field of Search .......................... 65/302, 335, 389, 65/109, DIG. 15; 264/311; 425/435; 249/137; 432/103, 106, 107

(56) References Cited

U.S. PATENT DOCUMENTS 1,663,093 A * 3/1928 Peiler

* cited by examiner

*Primary Examiner*—Michael Colaianni
(74) *Attorney, Agent, or Firm*—Mary Y. Redman

(57) ABSTRACT

An apparatus and process for fabricating tubing used in the making of chalcogenide fibers. The apparatus features a three-sectioned melt/spin ampoule that allows for fabricating the chalcogenide tubing without introducing impurities and contaminants, in a self-contained apparatus.

10 Claims, 1 Drawing Sheet

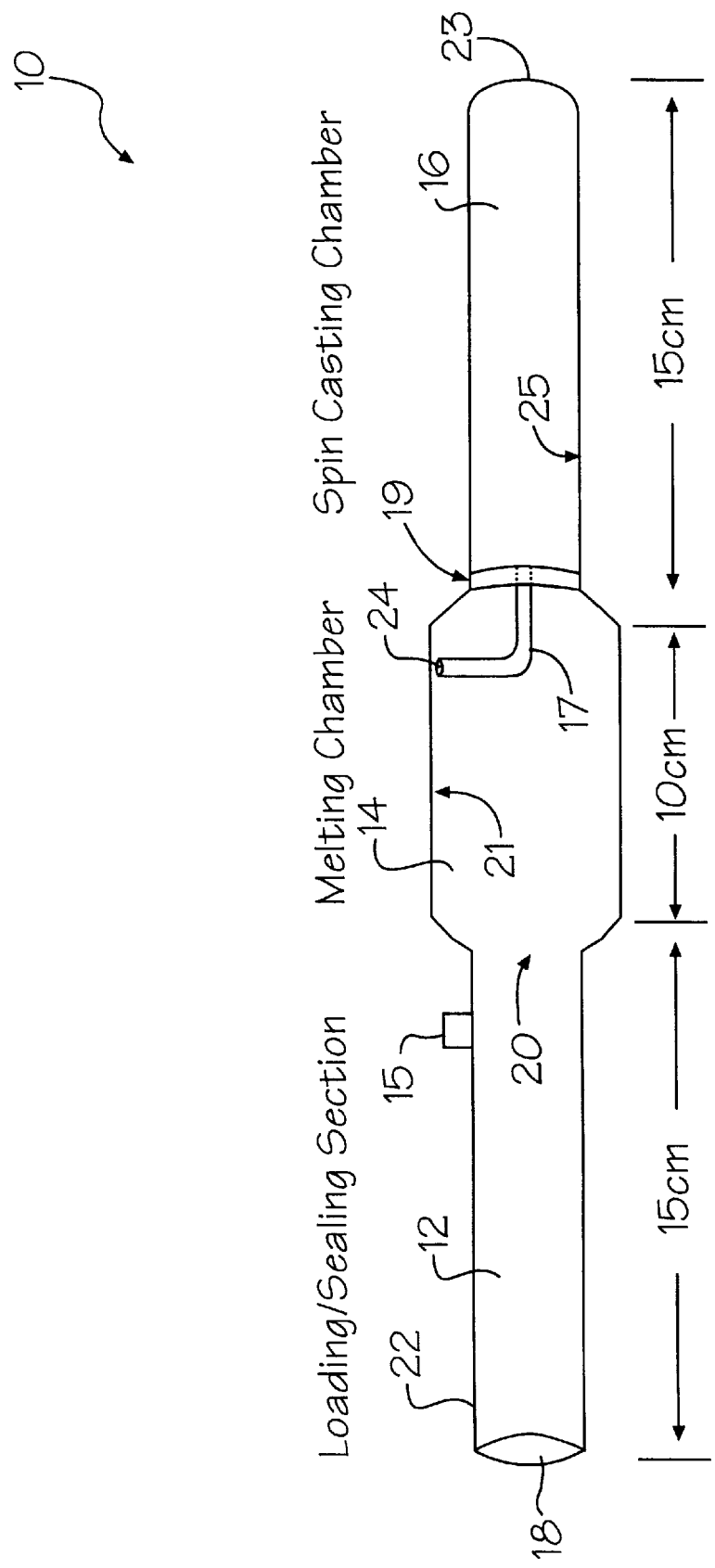
The Figure

CHALCOGENIDE GLASS TUBING FABRICATION

FIELD OF THE INVENTION

The present invention relates to fabricating waveguide materials for the fiber-based materials industry and, more particularly, to a novel ampoule that provides for a contaminant-free, chalcogenide glass tubing fabrication process.

BACKGROUND OF THE INVENTION

In the fabrication of waveguiding fibers for telecommunications, chalcogenide glasses (non-oxide glasses, based on sulfur, selenium and tellurium) are candidate materials for providing low loss transmission in the near to mid infrared. Moreover, rare-earth doped chalcogenide glasses are useful materials for the fabrication of efficient optical amplifiers and/or lasers. In particular, Pr-doped, (GeAs) sulfide glasses are considered promising materials for providing gain in the range of 1,300 nm, as taught by B. G. Aitken et al. in U.S. Pat. No. 5,389,584 for Ga- AND/OR In- CONTAINING AsGe SULFIDE GLASSES. At present, the best fiber design consists of a Pr-doped, Ga-codoped, GeAs sulfide core that is surrounded by a lower index GePAs or GeAs sulfide cladding, as taught by B. G. Aitken et al. in copending patent application, Serial No. 09/530,831, filed on May 3, 2000, and hereby incorporated by reference.

In order to fabricate rod-in-tube preforms of this material or other chalcogenide glasses that can be redrawn into fibers, a necessary first step requires making tubing from the selected cladding glass. The current method used to produce such tubing consists of a two step process. First, the batch material is loaded into a melting ampoule, and then melted and quenched to form a solid cylindrical glass rod. Then, the glass rod is loaded into a forming ampoule, melted, spun cast upon a mechanical lathe and quenched into glass tubing.

The solid glass rod can become contaminated during its removal from the "melting" ampoule, and also while transferring and loading it into the "forming" ampoule. For example, the surface of the pristine, solid glass rod can be contaminated with air-borne particles, silica pieces from the fractured "melting" ampoule, and other impurities. These adulterants can cause partial devitrification of the cladding glass during preform redraw, which results in fiber attenuation losses that are much greater than the theoretical minimum.

As a practical matter, a 1,300 nm amplifier fiber must have an attenuation loss no greater than 1 dB/m. Other applications, such as sensing or laser-power delivery, require even lower loss. Therefore, it would be immensely beneficial to eliminate any chance of introducing potential impurities during the chalcogenide fiber fabrication process.

The present invention reflects the discovery that spun-cast tubing of chalcogenide glass to be used as cladding or fiber can be fabricated directly from batch materials in a single apparatus process. The new, single apparatus process eliminates the transferring step.

The current invention provides a novel ampoule design that combines the melting and spinning steps within the ampoule, and hence prevents introduction of impurities.

SUMMARY OF THE INVENTION

In accordance with the present invention, there is provided an apparatus and method for fabricating chalcogenide glass tubing to be used in making fibers. The apparatus comprises a new melt/spin ampoule for melting and forming chalcogenide glass materials. The ampoule comprises three sections. The first section comprises a loading chamber that is open at one end and attached to a second chamber at its other end. The loading chamber is provided with a small external flange, whose orientation is coplanar with a bent drainage tube that is disposed in the second melting This second section is attached to, but separated from the third section (a forming or spin casting channel) by a septum that is fitted with the drainage tube. The drainage tube is centered in the septum and extends into the melting chamber. The tube is bent in an arc that terminates close to the side wall of the melting chamber.

The requisite raw materials for making the chalcogenide tubing, including but not limited to elemental Ge, As, P and S, are introduced into the open end of the first ampoule section. The loaded ampoule is evacuated and then sealed by heating the wall of the first section to collapse the tubing. The sealed ampoule is then placed in a rocking furnace in such a way that the external flange on the loading chamber and, hence, the open end of the drainage tube is located in an upright position. This procedure ensures that, at high temperature, and with the rocking motion (approximately ±30° from horizontal) of the furnace, molten glass is prevented from flowing into the forming chamber.

The ampoule is then heated to produce a homogeneous chalcogenide melt in the melting chamber. The heated ampoule containing the chalcogenide melt is then transferred to a vertical furnace operating at approximately the final melting temperature. The ampoule is suspended with an orientation that allows the chalcogenide melt to drain into the forming chamber.

The hot ampoule is then removed from the furnace, attached to a lathe, and spun in order to form the chalcogenide glass tubing. The ampoule is then removed from the lathe and quenched. This causes the chalcogenide glass tubing to delaminate from the ampoule wall, and prevents cracking as the ampoule cools to ambient temperature.

BRIEF DESCRIPTION OF THE DRAWING

A complete understanding of the present invention may be obtained by reference to the accompanying drawing, when considered in conjunction with the subsequent detailed description, in which:

THE FIGURE illustrates a schematic, front view of the ampoule used for fabricating chalcogenide glass, in accordance with the invention.

DESCRIPTION OF THE PREFERRED EMBODIMENT

Generally speaking, the invention features a novel apparatus for fabricating chalcogenide tubing (e.g., sulfide tubing). The apparatus features a fused quartz, three-sectioned, melt/spin ampoule for fabricating the sulfide tubing without contamination, in a self-contained apparatus. It should be understood, however, that other materials can be used to form the ampoule 10, such as Pyrex, Vycor, fused silica, or the like.

Now referring to THE FIGURE, the melt/spin ampoule 10 of this invention is shown. As aforementioned, the new melt/spin ampoule 10 is preferentially made from fused quartz or fused silica tubing. The ampoule 10 has three chambers 12, 14, and 16, respectively, and is 40 cm in overall length. The first section, or loading and sealing chamber 12, is 15 cm long, made from 10 mm ID×16 mm OD tubing. This section 12 is open at its end 18, and attached at its other end 20 to the second chamber 14. The loading chamber 12 is provided with a small external flange 15, that is oriented to be coplanar with a bent drainage tube 17 so that the apparatus 10 is oriented in the furnace in such a way as to prevent liquid from entering the tube 17 during the melting step. The drainage tube 17 is 4 mm ID×6 mm OD.

The second section 14 (melting chamber) is 10 cm long and fabricated from 26 mm ID×30 mm OD tubing. It is designed to accommodate a 35 to 45 gm batch of materials. Section 14 is attached to, but separated from the third section 16 (forming or spin casting chamber), by a septum 19, that is fitted with the drainage tube 17. The drainage tube 17 is centered in the septum 19, and extends into the melting chamber 14. The drainage tube 17 is bent in a 90° arc that terminates about 3 mm from the side wall 21 of the melting chamber 14. The forming chamber 16 is 15 cm long and is made from 10 mm ID×16 mm OD tubing. The end 23 of this tube 16 is closed.

The requisite raw materials for making the sulfide tubing (e.g., elemental Ge, As, P and S) are introduced into the open end 18 of the first ampoule section 12 using a funnel (not shown). A plug (not shown) can be inserted into the proximal end of ampoule 10 to prevent backstreaming of batch material during evacuation and sealing. The materials-loaded ampoule 10 is evacuated to $\leq$(less than or equal to) $10^{-3}$ Torr, and then sealed by heating the wall 22 of the first section 12 to collapse the tubing. The sealed ampoule 10 is then placed in a rocking furnace (not shown) in such a way that the external flange 15 on the loading chamber 12 and, hence, the open end 24 of the drainage tube 17 is located in an upright position. This procedure ensures that, at high temperature, and with the rocking motion (±30° from horizontal) of the furnace, molten glass is prevented from flowing into the melting chamber 14.

In the preferred embodiment, the ampoule 10 is then heated to produce a homogeneous molten chalcogenide glass in the melting chamber 14. The ampoule 10 is initially heated to approximately 200° C., at a rate of approximately 6.7° C./min. Following a thirty-minute hold at approximately 200° C., the ampoule is heated to approximately 600° C., at a rate of about 0.67° C./min. After a ten-hour hold at 600° C., the ampoule 10 is heated to approximately 800° C., at a rate of about 0.33° C./min. Following a ten-hour hold at 800° C., the ampoule 10 is brought to the final melting temperature of approximately 875° C. at an approximate rate of 0.13° C./min. The melting schedule is completed after about thirty hours at the final melting temperature.

The heated ampoule 10 is then transferred to a vertical furnace (not shown) operating at approximately the final melting temperature. The vertical furnace temperature should be sufficient to avoid crystallization and to provide fluidity to the melt for drainage. The ampoule 10 is suspended with an orientation that allows the molten glass to drain into the melting chamber 14. After approximately twenty hours, the viscous, molten glass drains from the melting chamber 14. The hot ampoule 10 is then attached to a lathe (not shown), and spun at about 2,800 rpm for about four to five minutes, in order to form the chalcogenide glass tubing. An insulating holder or fixture (not shown) can be attached to the distal end 23 of the hot ampoule 10 in order to retain the ampoule 10 without causing slippage or stress while spinning.

The ampoule 10 is then removed from the lathe, and quenched by gradual immersion into a water bath. It should be understood that other quenching methods, well known in the art, can be used. This causes the chalcogenide glass tubing to delaminate from the ampoule wall 25 in the spin section 16, and prevents cracking as the ampoule cools to ambient temperature. The inventive technique has successfully fabricated 15 cm lengths of 10 mm OD GeAs and GeAsP sulfide glass tubing with a wall thickness between approximately 1.5 and 2.7 mm.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims

What is claimed is:

1. An apparatus for fabricating spun-cast glass tubing, comprising an ampoule having three sections, a first loading section for loading glass-forming materials, a second melting section attached to said first loading section for melting materials loaded into said ampoule, and a third, spin-casting section attached to said second melting section for spinning melted glass materials to form said spun-cast, glass tubing.

2. The apparatus for fabricating spun-cast glass tubing in accordance with claim 1, wherein said spun-cast glass tubing comprises cladding glass.

3. The apparatus for fabricating spun-cast glass tubing in accordance with claim 1, wherein said glass-forming materials chosen from a group comprising Ge, As, P, and S.

4. The apparatus for fabricating spun-cast glass tubing in accordance with claim 1, wherein said ampoule comprises a silicate glass.

5. The apparatus for fabricating spun-cast glass tubing in accordance with claim 4, wherein said silicate glass comprises fused quartz.

6. The apparatus for fabricating spun-cast glass tubing in accordance with claim 1, further comprising a drainage tube attached to a septum and disposed between said second section and said third section.

7. The apparatus for fabricating spun-cast glass tubing in accordance with claim 6, wherein said second section has an inner wall, and said drainage tube extends from said septum and has an open end adjacent said inner wall of said second section.

8. The apparatus for fabricating spun-cast glass tubing in accordance with claim 6, wherein said drainage tube extends in an arc from said septum.

9. The apparatus for fabricating spun-cast glass tubing in accordance with claim 1, further comprising a flange extending from said ampoule.

10. An apparatus for fabricating spun-cast, chalcogenide glass tubing, comprising an ampoule having three sections, a first loading section for loading glass-forming materials, a second melting section attached to said first loading section for melting materials loaded into said ampoule, said second section having an inner wall, and a third, spin-casting section attached to said second melting section for spinning melted glass materials to form said spun-cast, chalcogenide glass tubing, a septum being disposed between said second section and said third section and having a drainage tube extending therefrom.

\* \* \* \* \*